INVENTOR.
WALTER I. KREWSON, JR.
BY
Fay & Fay
ATTORNEYS

Sept. 28, 1965   W. I. KREWSON, JR   3,208,134
METHOD OF REPLACING WORN PARTS IN AUTOMOBILE
ASSEMBLIES AND THE TOOLS THEREFOR
Filed Nov. 30, 1961   4 Sheets-Sheet 3

INVENTOR.
WALTER I. KREWSON, JR.
BY
*Fay & Fay*
ATTORNEYS

United States Patent Office 3,208,134
Patented Sept. 28, 1965

3,208,134
METHOD OF REPLACING WORN PARTS IN AUTOMOBILE ASSEMBLIES AND THE TOOLS THEREFOR
Walter I. Krewson, Jr., Bay Village, Ohio, assignor to Superior Pneumatic and Manufacturing Company, Cleveland, Ohio, a corporation of Ohio
Filed Nov. 30, 1961, Ser. No. 156,027
20 Claims. (Cl. 29—401)

This invention relates and is directed to a method of replacing worn parts in automobile front-end suspension assemblies and steering linkage assemblies, and the necessary tools therefor.

An object of the invention is provide procedures and tools for accomplishing said procedures which result in the minimizing of labor costs on front-end repair jobs.

Another object of the invention is to adapt a pneumatic device of the type found in most automobile service stations and garages for use in replacing worn parts in automobile front end suspension assemblies and steering linkage assemblies.

Another object of the invention is the provision of a method of replacing worn bushings in automobile control arms and steering linkage assemblies containing flanged hollow bushing members tightly fitted therein.

A further object of the invention is the provision of a method of replacing worn parts mounted on an element of a steering linkage assembly which includes at least one cylindrical hole within which a cylindrical hollow bushing member is tightly seated and at least one tapered hole within which a complementary tapered male portion of a ball joint is seated.

A still further object of the invention is the provision of a method of replacing worn spindle connecting rod ends in an automobile steering linkage assembly.

It is a further object of the invention to provide a novel and expedient method of disassembling a ball joint from an automobile front-end suspension assembly or steering linkage assembly.

It is another object of the invention to provide a novel method of attaching the flanged shank of a tool to the barrel of a pneumatic device.

It is a more specific object of the invention to provide a novel spring element for attaching the flanged shank of the tool to a pneumatic device.

It is another object of the invention to provide a tool for use with a pneumatic device for simultaneously cutting and pushing bushing sleeves from holes.

It is another object of the invention to provide a tool for use with a pneumatic device for installing bushings of various sizes into holes.

It is another object of the invention to provide a tool for use with a pneumatic device for vibrating a structural member having an elongated arcuate surface thereby facilitating disassembly.

It is another object of the invention to provide a tool for use with a pneumatic device for separating assembled parts by means of a succession of non-linear components of force transmitted through wedge-shaped surfaces.

Other objects and advantages will become apparent hereinafter when the following specification is read in conjunction with the accompanying drawings.

In the following description of the drawings, like numerals are used to designate like parts in the several views.

Figure 1:
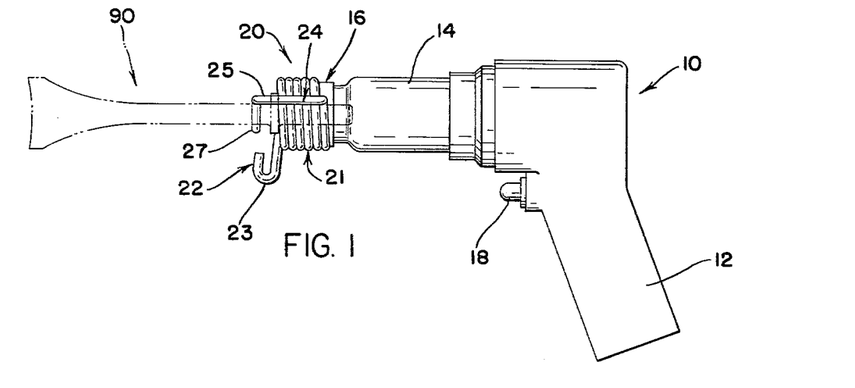
FIG. 1 is a side elevation illustrating one form of pneumatic device in use with the spring-retainer element of this invention to hold the flanged shank of a tool.

FIG. 1 illustrates a pneumatic device, generally designated by the numeral 10, of the conventional type normally found in automobile service stations and garages. The device includes a handle 12, a barrel portion 14, having threaded portion 16 on its end opposite the handle and an actuating means or trigger 18 for controlling the supply of air to the device. The particular air hammer schematically illustrated has a metering trigger which delivers 0 to 2800 controllable blows per minute. A hammer of this type weighs approximately 3½ pounds and measures 8½ inches over all. Threadedly attached to the portion 16 of the barrel 14 is a spring retainer element 20 which engages and holds the various flange-shanked tools of this invention inserted in the barrel and positioned as illustrated in phantom in FIG. 1.

Figure 11:
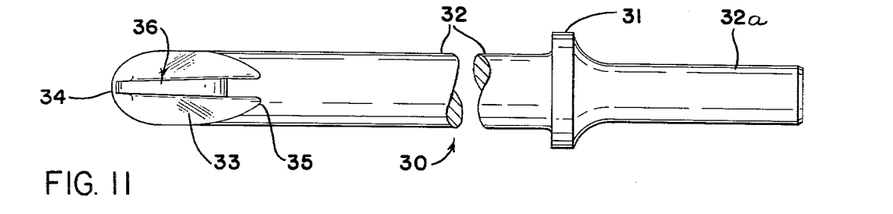
FIG. 11 is a broken plan view of the tool of FIG. 10.
Figure 12:
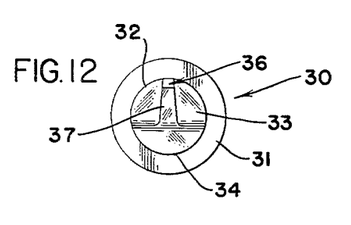
FIG. 12 is an end view of the tool of FIG. 10.
Figure 13:
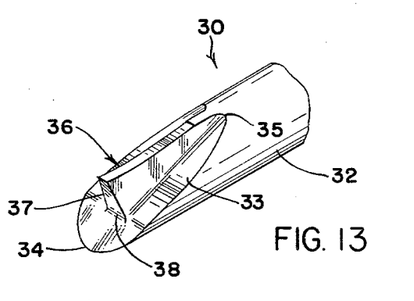
FIG. 13 is a perspective view of the tool end illustrated in FIG. 10.

The spring retainer element 20 is designed especially to cooperate with a pneumatic device of the type illustrated but may be used with other pneumatic impact tools. As illustrated in detail in FIGS. 5–9, the spring retainer element 20 has a tightly wound helical portion 21 having a diameter such that it threadedly cooperates with the threaded portion 16 of the barrel of the pneumatic device 10. On one end of the helical portion 21 is a tang 22 extending outwardly from the helix at a tangent and having a bight portion 23 on its end to facilitate engagement with a finger or thumb. From adjacent the opposite end of the helical portion 21 a tang 24 extends out tangentially to a position spaced from the helical portion 21 and is shaped so as to define a straight portion 25 parallel to the axis of the helical portion 21, which extends axially past the end of the helical portion 21 adjacent the tang 22 to form a second projecting portion 27 angularly spaced at less than 180 degrees and preferably less than 90 degrees from the tang 22. This facilitates one-handed compression of the tangs 22 and 24 in a direction toward each other. At the forward end of the tang portion 24 is a portion 26 which extends through the space axially aligned with the periphery of the helical portion 21 and which includes arcuate bend portion 27 intermediate thereof which is substantially coaxial with the helical portion. The arcuate portion 27 has a radius larger than the radii of the shanks of the tools, such as shank 32 of tool 30, illustrated in FIG. 11, to be used with the pneumatic device 10 but smaller than the radii of the tool flanges, such as flange 31 on the shank 32. This permits the insertion of the flanged tool shank coaxially into the barrel 15 of the pneumatic device 10 as illustrated in FIG. 5. By compressing the spring retainer element projections 22 and 24 with a thumb and opposing fingers to move the arcuate bend 27 to a position of substantial tangential alignment with the helical portion 21, the flange of the tool may be inserted into the barrel 15 and the spring retainer element 20 into a position such that the flange lies in the space between the helical portion 21 and the arcuate bend 27. Upon release of the hand exerted compressing forces between the projections 22 and 24 of the spring retainer element 20, the arcuate bend 27 firmly engages and seats about the tool shaft in such position that the pneumatic device 10 may deliver a succession of impacts to the end of the shank upon actuation of the device, as shown in FIG. 5.

The spring retainer element 20 is of particular merit to the invention in that it permits a quick and efficient one-hand operation for attaching the flanged shanks of the various tools to the pneumatic device 10. This, of course, is due to the angular disposition of the tangs 22 and 24 and their provision adjacent one end. It will be noted that the spring retainer element 20 permits rotation of the tool shank within the barrel to minimize the possibility of jamming the tool shank in the barrel 15 upon actuation of the pneumatic device 10. It has been found advisable in constructing the spring retainer element 20 to extend the portion 26 back along the helical portion 21 in a manner shown by extension portion 28 in the drawings. This provision enables the end 29 of the extension portion to be given the same arcuate bend as the turns of the helical portion 21 by permitting it to be engaged in the threaded portion 16 on the barrel 15 to give additional support and rigidity to the assembly.

The method of attaching the flanged shank of a tool to the pneumatic device 10, using the spring retainer element 20, is extremely simplified in view of the described structural characteristics of the retainer.

The use of a pneumatic device, such as illustrated in FIG. 1, in a method of replacing worn parts in automobile front end assemblies or steering linkage assemblies in accordance with the method of this invention, utilizing the tools herein described, permits the reduction in labor costs of up to 75 percent on these front end repair jobs. It is the practice in the automobile repair industry to charge for servicing automobiles on the basis of rates published in what is commonly known as a flat rate book. Accordingly, the amount of charge for the repair of a particular assembly is very well standardized on the predicted labor involved. Using the teachings of this invention, an automobile service man accordingly may increase his profits on front end repair jobs involving the replacement of worn bushings, ball joints, and other components.

As is well known, in the conventional automobile suspension systems, there is a member called a wheel spindle upon which the front wheel of an automobile is suspended, which has an upper pivoting joint member and a lower pivoting joint member attached thereto. These joints in turn are connected to an upper control arm and a lower control arm which are pivotally secured to the frame of the automobile and are separated by a spring, such as a coil spring. The turning of the wheels is accomplished through spindle tie rods having pivoting rod ends which engage the spindle member and are connected to the spindle tie rods by means of clamped split sleeves. The other ends of the spindle tie rods are pivotally connected to steering arms to idler arm rods which, of course, are actuated by means of the steering wheel through the steering gear. In view of the conventionality of this arrangement, no attempt has been made to illustrate the entire structure and the individual components involved in the method are shown separately.

Figure 2:
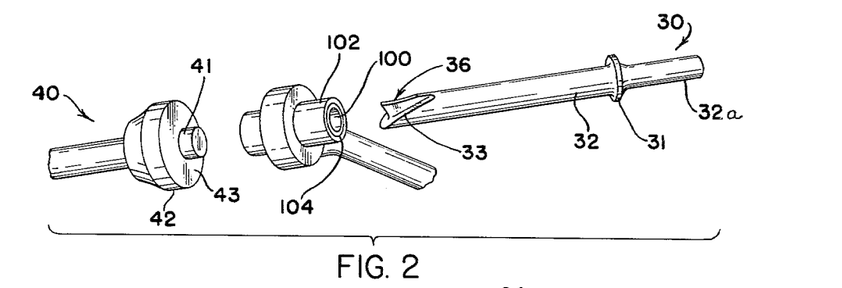
FIG. 2 is a perspective view of a bushing cutting and pushing tool and a bushing inserting tool in use according to the principles of this invention.
Figure 22:
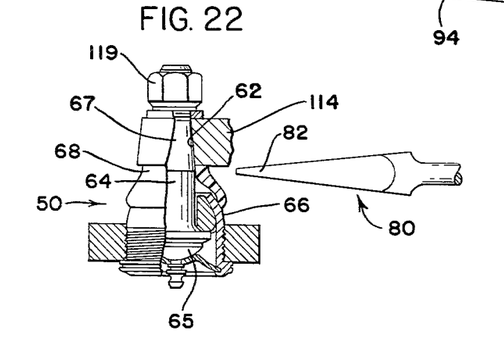
FIG. 22 is a view of the ball joint and rod end disassembly tool of FIG. 19 in use according to the principles of this invention.

FIG. 2 illustrates an arm, such as the steering arm to idler arm rod, having a cylindrical hollow bushing member 100 tightly seated in a supporting sleeve 102 which in turn is seated in the bore 104 in the end of the steering arm to idler arm rod. Elsewhere on the rod is positioned a ball joint 50, such as illustrated in FIG. 22, which includes a pivoting member 64 having an enlarged portion 65 and a tapered male portion 67 seated in a complementary tapered hole 62 in the rod. The bushing cutting and pushing tool 30, which is illustrated more in detail in FIGS. 10 to 14, is used for removal of the bushing 100 from the sleeve 102 and includes a shank portion 32 having a radially directed flange 31 for engaging the spring retainer 20 as illustrated in FIG. 1. The flange 32 is provided adjacent a reduced diameter end portion 32a of the shank 32 which is dimensioned to cooperate with the hollow portion of the barrel of the particular pneumatic device being used, as illustrated in FIG. 5.

Figure 10:
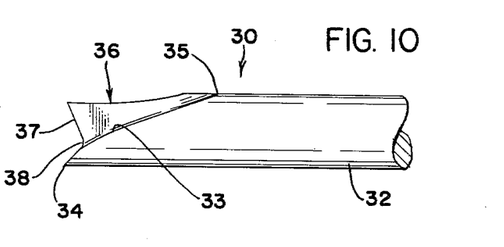
FIG. 10 is a fragmentary elevation of a bushing cutting and pushing tool.

The gently curved beveled portion 33 of the tool 30 extends from the lower forwardmost end point 34 on the shank periphery to a diametrically opposed upper point 35 on the shank periphery, axially spaced therefrom a distance in excess of the diameter of the shank 32 but less than three times said diameter. The beveled portion 33 preferably is slightly arcuate and is symmetrically divided over a portion of its periphery adjacent the shank by a radially extending tapered thin portion 36 having its maximum radial projection within the space axially aligned with the shank 32. The end of the thin portion 36 forms a flat surface 37 transverse to the shank of the tool which defines with the divided portion of the beveled surface 33 a V-shaped channel having an angle 38 axially rearward of the point 34 and the point formed by the intersection of the front surface 37 and the top surface of the thin portion 36.

Figure 14:
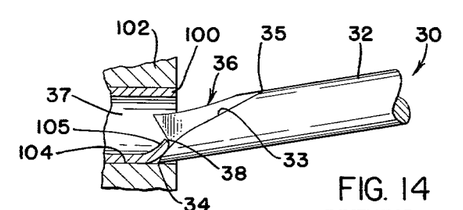
FIG. 14 is a fragmentary elevation of the bushing cutting and pushing tool of FIG. 10 in its initial stage of operation in cutting and pushing a cylindrical bushing.

As shown in FIG. 14 the cylindrical bushing 100 and and its supporting sleeve member 102 are disassembled, using the tool 30 in the following manner. Point 34 is positioned in the crack between the bushing 100 and the sleeve 102. The shank 32 of the tool 30 is angled with respect to the bushing axis such that the forward surface 37 extends at least partially into the bore of the bushing 100. With the tool 30 mounted in the pneumatic device 10, as generally illustrated in FIG. 1, a succession of holes is imparted to the tool by actuation of the device 10 thereby cutting the bushing 100 at one point to turn up a small flange 105 which travels rearward on the beveled surface 33 to the angle 38 and then curls forward along the surface 37 a short distance. A further succession of blows from the pneumatic device 10 drives the tool 32 forward such that the surfaces 33 and 37 push the bushing 100 axially through the bore of the supporting sleeve member 102 thereby driving the bushing 100 from said bore. From this it will be seen that the tool 30 sequentially first cuts a bushing flange in the cylindrical bushing and then uses said flange as an abutment to obtain an axial force receiving surface for driving the bushing out of its seat. In order to avoid slipping, it is important that the forwardmost point of the surface 37 is its end opposite the angle 38. It is important also that the bevel on surface 33 extends a distance in excess of the shank diameter but less than three times said diameter because of the criticality in the angle 38 which permits initial cutting of the bushing 100 and subsequent pushing action. The provision of the thin portion 36, such that its maximum radial projection is within the space axially aligned with the shank 32, enables the use of this tool on the smallest possible hollow bushing 100 for a given tool shank diameter, since the thin portion 36 must be positioned within the bore of the bushing to provide the proper sequential cutting and pushing action of the pneumatically actuated tool.

In FIG. 2 the illustrated tool 40 is a bushing inserting tool for use in the pneumatic device 10 for installing bushings of various sizes into holes. It may be used either to install cylindrical bushings of the type illustrated in FIG. 2, or flange bushings, such as bushing 125 in FIG. 4. Its flanged shank, of course, is similar to the flanged shank of tool 30 and functions in the same manner in cooperation with the pneumatic device 10.

Figure 15:
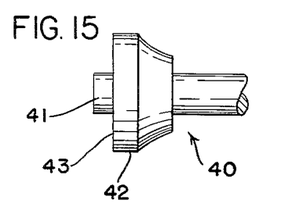
FIG. 15 is a side view of a bushing installing tool according to the principles of this invention.
Figure 16:
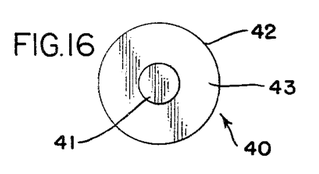
FIG. 16 is an end view of the tool of FIG. 15.

Integrally disposed on the forward end of the tool 40 is a pilot cylinder portion 41, as illustrated in detail in FIGS. 15 and 16, and coaxially disposed axially rearwardly of the pilot portion 41 is a driving cylinder portion 42 having an end surface 43 substantially perpendicular to the shank for delivering a succession of impacts in a direction axial thereto from any of a plurality of noncoaxial areas on said end surface. The driving cylinder 42 is of a diameter at least twice the diameter of the pilot cylinder portion 41 to facilitate the multitude of various size flanged and cylindrical bushings which are found on the various components of an automobile. Since tool 40 is adapted particularly for use with the pneumatic device 10, it is important that the driving surface 43 be large enough to provide a multitude of different seats for transmitting force since the pneumatic device 10 is not easily held in one position for a succession of blows. It is important also that the pilot cylinder 41 be of smaller diameter than the smallest bushing with which it is to be used and that no attempt be made to use the pilot cylinder 41 in situations where the hollow portion of the bushing is tight fitting thereon since the succession of impacts caused by actuation of the pneumatic device 10 will severely damage the inner bushing surface during installation. It is for this reason that the relationship between the driving surface 43 and the pilot cylinder 41 must be retained so that the diameter of the former is at least twice the diameter of the pilot cylinder portion. The control possible with pneumatic device 10 demands that the function of the pilot shoulder 41 is more a prevention of side slip during actuation than of precise locating. It is important, also, of course, that the minimum difference in the diameters of the two cylindrical portions be maintained so that the tool 40 is adapted for use with several sizes of hollow bushings, be they flanged or cylindrical. In using the tool 40, the bushing to be installed, such as the bushing 100, is placed in coaxial alignment with the hole 104 and the pilot cylinder 41 of the tool 40 inserted in the hollow of the bushing until the surface 43 abuts the end of the bushing 100. The trigger on the pneumatic device 10 is then pulled, actuating the device to drive the replacement bushing into the hole, and the arm is then ready for receipt of an idler arm or similar pivoting member. After being mounted between the idler arm and the steering gear, the steering arm to idler arm rod is reattached to the tapered pivoting joints of the spindle tie rod.

Figure 3:
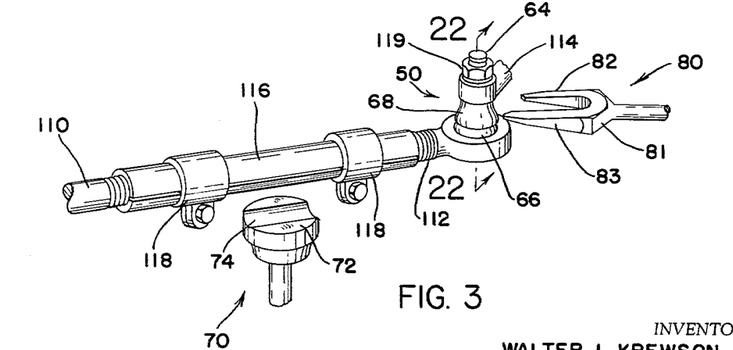
FIG. 3 is a perspective view of a ball joint and rod-end disassembly tool and a rod and sleeve vibrating tool in use according to the principles of this invention.

FIG. 3 illustrates a spindle tie rod 110, a rod end 112, and a cooperating portion of a spindle 114 showing the conventional split sleeve 116 and clamps 118 which provide for toe-in adjustment. The spindle rod 110 has a threaded end threadedly engaging the split sleeve 116 and the spindle tie rod end 112 has a threaded portion engaging the opposite end of the split sleeve 116, such that the rod 110 may be moved relative to the rod end 112 to adjust the toe-in of the wheels as is well known. The rod end includes a pivoting ball joint of the type illustrated in FIG. 22 which has a tapered pivoting male member seated in the cooperatively tapered bore of the end of the spindle member 114; a nut member 119 is secured on the end of the tapered male portion 64 in conventional manner. The opposite end of the member 64 is enlarged to provide a smooth bearing surface and prevent separation of the pivoting portion from the housing 66. The housing 66 is suitably secured within a bore in the rod end 112.

Figure 17:
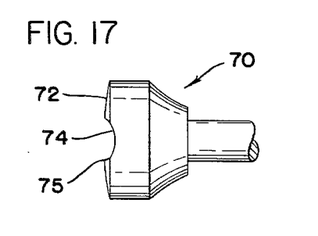
FIG. 17 is a fragmentary side view of the rod and sleeve vibrating tool according to the principles of this invention.
Figure 18:
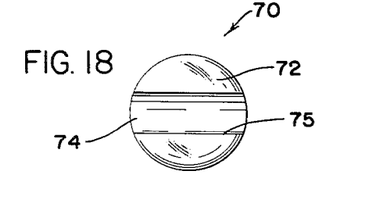
FIG. 18 is an end view of the tool of FIG. 17.

To replace the rod end 112 the illustrated parts are first disassembled by means of a tool 70 as shown in FIG. 3 and illustrated in detail in FIGS. 17 and 18. The tool 70 is a vibrating tool for loosening the various threadedly engaged component parts which are likely to be rusted or otherwise tightly secured due to the extended use of the automobile through all types of conditions. The vibrator tool 70 has a flanged tool shank similarly dimensioned to the shank of the tool 30 for cooperation with the pneumatic device 10 and the spring retainer 20. The head of the tool 70 is of generally cylindrical design and includes on its outer end surface 72 a diametrically disposed channel 74 having an arcuate cross-section of such dimension as to receive readily the split sleeve 116 therein. The cylindrical shape of the tool 70 has been found to be particularly advantageous in using the tool for delivering a succession of blows by means of the pneumatic device 10 in that the unchanneled portion of the cylindrical head provides for a recovery of the positioning of the tool should the workpiece slip from the channel. This minimizes the necessity of reorientation and alignment of the channel with the workpiece. A slight taper away from the channel is given to the end surface 72 of the tool to provide a sharper definition of the channel 74 by means of the sharper angle formed at the edge 75. This feature also minimizes the slipping of the workpiece from the channel 74 during actuation of the pneumatic device 10 and resultant vibration of the arcuate workpiece 116. It has been found that providing the channel 74 with a width at least twice as great as its depth facilitates the accurate delivery of the succession of impacts to the sleeve member 116 upon actuation of the pneumatic device 10.

After the assembled parts have been loosened by vibration with the tool 70 the rod end pivoting member 64 is disassembled from the spindle 114 by removal of the nut 119 from its threaded end portion and axial wedging of the tool 80 between the rod end and the spindle to drive the tapered male portion 64 from engagement with the tapered female portion of the spindle member 114.

Figure 19:
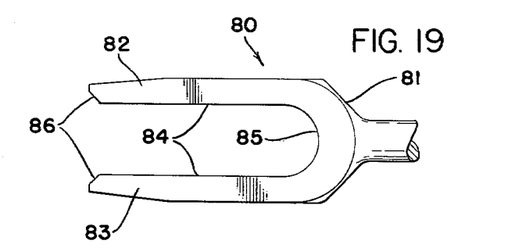
FIG. 19 is a plan view of the ball joint and rod end disassembly tool according the principles of this invention.
Figure 20:
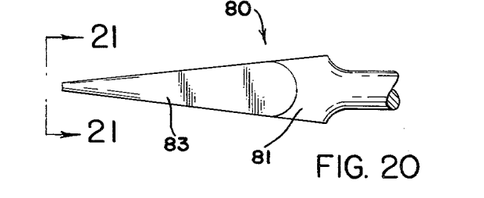
FIG. 20 is a side elevation view of the tool of FIG. 19.
Figure 21:
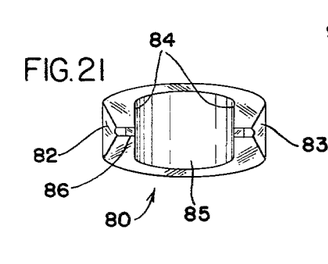
FIG. 21 is an enlarged end view in the direction indicated by the line 21—21 of FIG. 20.

The tool 80 is illustrated in detail in FIGS. 19 to 21 and includes a flanged shank of similar shape and dimension to that of the tool 30, and the other previously described tools. At the end of the shank of the tool 80 is a portion having an integral flared or shoulder area 81 supporting two wedge-shaped legs 82 and 83, both of which have a smooth internal surface 84 generally curving into an intermediate portion 85, so as to minimize possible damage to a workpiece located between the legs.

As illustrated in FIG. 20, the legs 82 and 83 are tapered by an amount varying from 5 to 30 degrees and preferably in the neighborhood of 10 to 15 degrees, which provides a substantial component of force perpendicular to the shank when the tool 80 is wedged between two workpieces, such as the rod end 112 and the spindle end 114.

As will be seen in FIG. 22, the ball joints 50, such as might be used in the rod end, may contain an elastomer casing or seal 68 between the enlarged head portion of the pivoting member and the tapered portion. The smooth surface of the interior of the legs 84 minimizes danger of harm to this seal. Moreover, the innermost points of the legs 82 and 83 are beveled as at 86 to prevent inadvertent rupture of the elastomer member 68 during actuation of the pneumatic device 10. After the rod end has been disassembled from the spindle by use of the tool 80 in a wedging manner, the clamps 118 of the split sleeve 116 are released and the rod end 112 is threadedly disengaged from the internal sleeve threads. A new rod end is then threadedly engaged in the threads of the sleeve 116 and the tapered male portion 62 of the pivoting member 64 is put into seated engagement with the complementary tapered female portion of the spindle member 14. The clamping means 11 then are tightened about the sleeve 116 to affix the steering assembly elements rigidly in their proper relative positions as illustrated.

It is obvious from the description that this method is merely one of the many repair sequences that may be used with the tool of this invention.

Figures 4, 6:
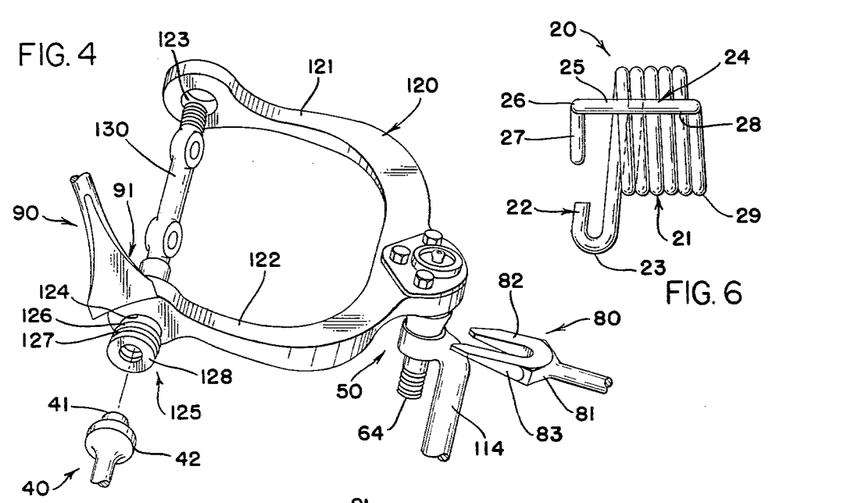
FIG. 4 is a perspective view of a bushing removing tool, a bushing inserting tool, and a ball joint and rod-end disassembly tool in use according to the principles of this invention.
FIG. 6 is a side elevation view of the spring retainer element of this invention in the same position as shown in FIG. 5.
Figures 5, 7, 8:
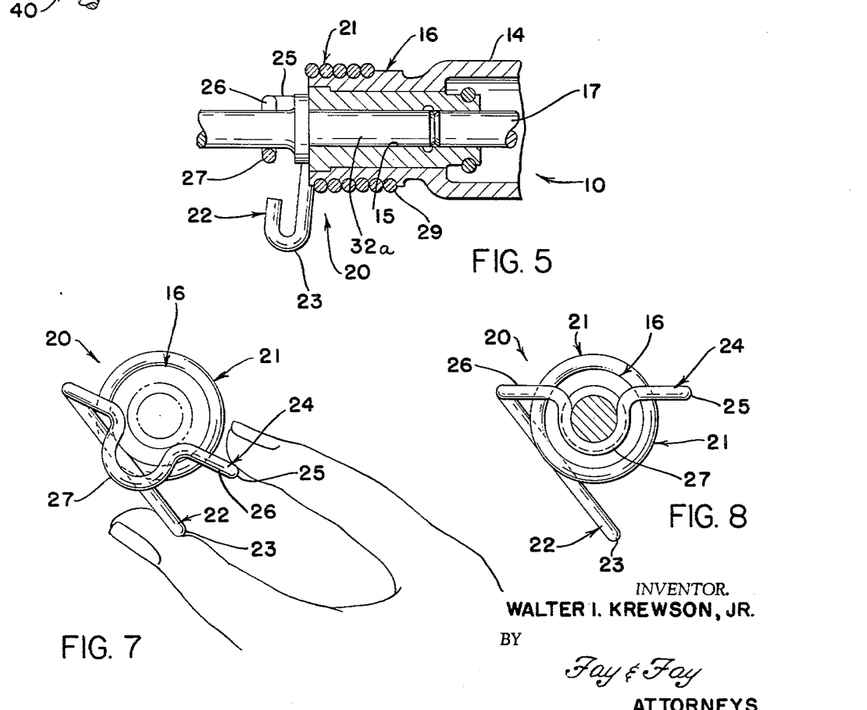
FIG. 5 is a fragmentary longitudinal section illustrating the structural cooperation of the pneumatic device, the spring retainer element, and the flanged tool shank.
FIG. 7 is an end view illustrating the hand compressed open position of the spring retainer element relative to an inserted flanged tool shank shown in phantom.
FIG. 8 is an end view similar to FIG. 7 illustrating the relaxed closed position of the spring retainer element relative to an inserted flanged tool shank.
Figure 9:
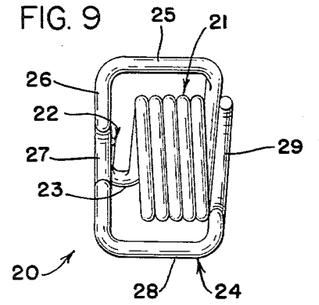
FIG. 9 is a plan view of the spring retainer element of FIG. 6.

FIG. 4 illustrates an upper control arm assembly connected to a spindle 114 where the upper control arm is a bifurcated member 120 having leg portions 121 and 122 with coaxially aligned cylindrical holes 123 and 124, respectively, disposed therein. Flanged, hollow bushing members 125 are disposed in the holes 123 and 124 to provide seats for the relative rotation of the arm 120 with respect to the shaft 130 which is rigidly attached to the automobile frame. The bushing 125 has an inner flanged member 126 tightly surrounded by a rubber grommet 127 and a cylindrical jacket 128, all of which are usually in prestressed condition and inserted and removed from within the holes 123 and 124 as a unit. In replacing worn bushings 125 in the control arm, the ball joint connected to the intermediate portion of the arm 120 is disassembled from the spindle 114 as previously described in connection with FIGS. 3 and 22, using the tool 80.

After the tapered male portion 64 of the ball joint 50 is disassembled from the complementary tapered spindle 114, the shaft 130 is secured by means of bolts to the frame and remains stationary while the control arm pivots about it. A detailed view of this conventional arrangement is illustrated in Patent No. 2,979,353 to J. P. Sellers, Jr., issued Apr. 11, 1961, or may be found in the front suspension system of the 1957 Ford as illustrated in Motor's Auto Repair Manual, twentieth edition, first printing, published by Motor, New York City, or in the 1960 Thunderbird Shop Manual, published by Ford Motor Co., Dearborn, Mich.

Figure 23:
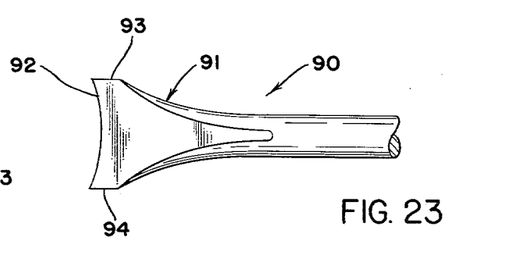
FIG. 23 is a fragmentary plan view of the bushing removing tool according to the principles of this invention.
Figure 24:
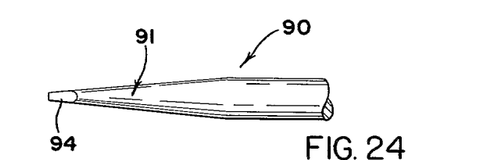
FIG. 24 is fragmentary side elevation of the tool of FIG. 23.
Figure 25:
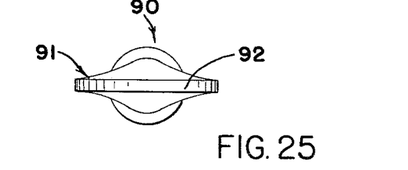
FIG. 25 is an enlarged end view of the tool of FIG. 23.

The bushings 125 are removed from their seats in the legs 121 and 122 by means of a tool 90 illustrated in detail in FIGS. 23–25. As will be obvious the tool has a flanged shank similarly dimensioned to tool 30 and the other tools illustrated for cooperation with the spring retainer 20 and the pneumatic device 10. The operating end of the tool 90 comprises a flared portion 91 which preferably extends out from either side of the shank a distance such that the width of the flared portion is in excess of twice the shank diameter. The end of the tool 90 has an arcuate work-engaging portion 92 which is transverse to the shank and bounded on its ends by surfaces 93 and 94 extending in a direction substantially parallel to the shank of the tool. The criticality of the width of the tool as measured between the surfaces 93 and 94, for instance, lies in the fact that when used with the pneumatic device 10 on a bushing, such as bushing 125, illustrated in FIG. 4, the rapid succession of shocks utilized by the tool causes it to jump about and move laterally, such that the width of the tool decreases the chance of its slipping out of work engaging position behind the flange 126 of the bushing. The flat arcuate surface 92 is necessary to prevent damage to the rubber bushing portion 127 since a sharp edge at this point would cause damage to the rubber bushing portion 127 or the flange portion 126 of the bushing and render it incapable of reuse even though it was not worn or damaged otherwise. Bushings of the type illustrated in FIG. 4 also may be installed by the tool 40 as previously described and the upper control arm disassembly steps reversed to assemble the replacement parts back in proper working position.

For ease of description, the principles of the invention have been set forth in connection with but a single illustrated embodiment showing a method and tools for repairing automobile front end suspension and steering systems. It is not my intention that the illustrated embodiment, nor the terminology used in describing it be limiting inasmuch as variations in these may be made without departing from the spirit of the invention. Rather, I desire to be restricted only by the scope of the appended claims.

The invention claimed is:

1. A method of replacing worn bushings in an automobile control arm and steering linkage assembly, said assembly including a bifurcated member with leg portions connected by an intermediate portion, said leg portions having coaxially aligned holes containing flanged hollow bushing members tightly fitted therein with said flanges disposed axially of said holes, said intermediate portion having a seat for an elongated pivoting joint member which includes an enlarged portion and an adjacent tapered male portion, said tapered male portion being seated in a complementary tapered female portion of a steering linkage element, said method including the steps of providing a pneumatic device capable of delivering a rapid succession of blows to the flanged shank of a tool attached thereto by means of a spring element secured thereon which may be opened and closed to receive the flanged portion of the tool shank by compression of the thumb and index finger of one hand of the operator against two integral projections thereon adjacent one end and angularly spaced at less than 180°, securing the spring element to the pneumatic device, compressing the spring element projections to open position, inserting in said spring element a cooperatively dimensioned flanged shank portion of a flared and bifurcated tool having wedge shaped internally smooth leg portions and an intermediate portion which spaces said leg portions a distance less than the overall width of the pivoting joint member enlarged portion and greater than the largest diameter of said tapered male portion, positioning the leg portions on opposite sides of said pivoting joint member between said enlarged portion and tapered male portion with their opposing outer surfaces in wedging engagement with the steering linkage element, actuating the pneumatic device to deliver a succession of impacts to the shank of the tool which results in an axial component of force being directed outwardly against the steering linkage element thereby driving the tapered female portion from engagement with the tapered male portion of the pivoting joint member, compressing the spring element projections to open position, removing the flanged shank of the flared and bifurcated tool and inserting the similarly dimensioned flanged shank of a flared and tapered tool having an arcuate work engaging surface transverse to the shank of said tool, positioning the arcuate surface against one bushing at an acute angle thereto between the bushing flange and its respective leg, actuating the pneumatic device to deliver a succession of impacts to the shank of the tool which results in an axial component of force being directed outwardly against the flange thereby driving the bushing from said hole, repeating the positioning and actuating steps on the other bushing to remove said other bushing from its respective hole, compressing the spring element projections to open position, removing the flanged shank of the flared and bifurcated tool and inserting the similarly dimensioned flanged shank of a tool having a pilot cylinder and driving cylinder concentrically and integrally disposed in coaxial relation with said flanged shank at the end opposite the end inserted in said spring element, positioning a flanged hollow replacement bushing in coaxial alignment with a hole in one of the control arm legs with the pilot cylinder of the tool in the hollow of the bushing and the end of the driving cylinder of the tool abutting the flange, actuating the pnuematic device to deliver a succession of impacts to the shank of the tool which results in an axial force being directed against the bushing thereby driving the bushing into said hole, repeating the positioning and actuating steps on another replacement bushing to drive said other bushing into the hole of the other control arm leg, and inserting the tapered male portion of the pivoting joint member into seated engagement with the complementary tapered female portion of the steering linkage element.

2. A method of replacing worn parts mounted on an element of an automobile steering linkage assembly, said element including thereon at least one cylindrical hole within which a cylindrical hollow bushing member is tightly seated and at least one tapered hole within which a complementary tapered male portion of an elongated pivoting joint member having an enlarged portion adjacent said tapered portion is seated, said method including the steps of providing a pneumatic device capable of delivering a rapid succession of blows to the flanged shank of a tool attached thereto by means of a spring element secured thereon which may be opened and closed to receive the flanged portion of the tool shank by compression of the thumb and index finger of one hand of the operator against two integral projections thereon adjacent one end and angularly spaced at less than 180°, securing the spring element to the pneumatic device, compressing the spring element projections to open position, inserting in said spring element a cooperatively dimensioned flanged shank portion of a flared and bifurcated tool having wedge shaped internally smooth leg portions and an intermediate portion which spaces said leg portions a distance less than the overall width of the pivoting joint member enlarged portion and greater than the largest diameter of said tapered male portion, positioning the leg portions on opposite sides of said pivoting joint member between said enlarged portion and said tapered male portion with their opposing outer surfaces in wedging engagement with the steering linkage element, actuating the pneumatic device to deliver a succession of impacts to the shank of the tool which results in an axial component of force being directed outwardly against the steering linkage element thereby driving the tapered male portion from engagement with the tapered female portion of the element, compressing the spring element projections to open position, removing the flanged shank of the flared and bifurcated tool and inserting the similarly dimensioned flanged shank of a tool having a gently curved bevel extending from the end point on the shank periphery to a diametrically opposed point on the periphery axially spaced therefrom a distance in excess of the shank diameter but less than three times said diameter, said beveled portion being symmetrically divided over a portion of its periphery adjacent the shank by a radially extending tapered thin portion having its maximum radial projection within the space axially aligned with the shank and having its forwardmost surface defining a V-shaped channel with the undivided portion of the beveled surface, positioning the beveled surface leg of the channel between the element hole and the cylindrical bushing with the thin leg of the channel extending partially into the hollow of the bushing, actuating the pneumatic device to deliver a succession of impacts to the shank of the tool which results in an axial component of force being directed inwardly against the bushing from the angular portion of the V thereby sequentially cutting a portion of the bushing and driving the bushing from said hole, compressing the spring element projections to open position, removing the flanged shank of the said beveled tool and inserting the similarly dimensioned flanged shank of a tool having a pilot cylinder and a driving cylinder of a diameter at least twice the diameter of the pilot cylinder concentrically and integrally disposed in coaxial relation with said flanged shank at the end opposite the end inserted in said spring element, positioning a hollow replacement bushing in coaxial alignment with the element hole with the pilot cylinder of the tool in the hollow of the bushing and the end of the driving cylinder of the tool abutting the end surface thereof, actuating the pneumatic device to deliver a succession of impacts to the shank of the tool which results in an axial force being directed against the bushing thereby driving the bushing into said hole, and inserting the tapered male portion of the pivoting joint member into seated engagement with the complementary tapered female portion of the steering linkage element.

3. A method of replacing worn spindle tie rod ends in an automobile steering linkage assembly, said assembly including as an element thereof, a rod end having a threaded stud member engaged by a complementary threaded, clamped split sleeve and a pivoting joint member having an enlarged portion and an adjacent tapered male portion, said tapered male portion being seated in a complementary tapered female portion of a spindle member, said method including the steps of providing a pneumatic device capable of delivering a rapid succession of blows to the flanged shank of a tool attached thereto by means of a spring element secured thereon which may be opened and closed to receive the flanged portion of the tool shank by compression of the thumb and index finger of one hand of the operator against the two projections thereon adjacent one end and angularly spaced at less than 180°, securing the spring element to the pneumatic device, compressing the spring element projections to open position, inserting in said spring element a cooperatively dimensioned flanged shank portion of a tool having a generally cylindrical head which includes on its outer end a diametrically disposed channel having an arcuate cross-section of such dimension as to receive the split sleeve readily therein, positioning the channel of the tool head against the split sleeve, actuating the pneumatic device to deliver a succession of impacts to the shank of the tool which results in vibration of the sleeve and clamps relative to each other and the threaded stud member of the rod end, compressing the spring element projections to open position, removing the flanged shank of the channel tool and inserting the similarly dimensioned flange shank portion of a flared and bifurcated tool having wedge shaped internally smooth leg portions and an intermediate portion which spaces said leg portions a distance less than the overall width of the pivoting joint member enlarged portion and greater than the largest diameter of said tapered male portion, positioning the leg portions on opposite sides of said pivoting joint member between said enlarged portion and said tapered male portion with their opposing surfaces in wedging engagement with the spindle member, actuating the pneumatic device to deliver a succession of impacts to the shank of the tool which results in an axial component of force being directed outwardly against the spindle member thereby driving the tapered male portion from engagement with the tapered female portion of the spindle member, releasing the clamping force on the split sleeve and rotationally disassembling the rod end from threaded engagement with the sleeve, rotationally assembling a replacement rod end in threaded engagement with the sleeve, inserting the tapered male portion of the replacement rod end into seated engagement with the complementary tapered female portion of the spindle member, clamping the split sleeve firmly in engagement with the rod end to affix the steering linkage assembly elements rigidly in their proper relative positions.

4. A method of disassembly of a joint having an elongated pivoting member which includes an enlarged portion and an adjacent tapered male portion, said tapered male portion being seated in a complementary tapered female portion of a second member, said method including the steps of providing a pneumatic device capable of delivering a rapid succession of blows to the flanged shank of a tool attached thereto by means of a spring element secured thereon which may be opened and closed to receive the flanged portion of the tool shank by compression of the thumb and index finger of one hand of the operator against two integral projections thereon adjacent one end and angularly spaced at less than 180°, securing the spring element to the pneumatic device, compressing the spring element projections to open position, inserting in said spring element a cooperatively dimensioned flanged shank portion of a flared and bifurcated tool having wedge shaped internally smooth leg portions, and an intermediate portion which spaces said leg portions a distance less than the overall width of the pivoting member enlarged portion and greater than the largest diameter of said tapered male portion, positioning the leg portions on opposite sides of said pivoting member between said enlarged portion and tapered male portion with their opposing outer surfaces in wedging engagement with the member having the tapered female portion, actuating the pneumatic device to deliver a succession of impacts to the shank of the tool which results in an axial component of force being directed outwardly against the enlarged portion of the pivoting member, thereby driving the tapered female portion from engagement with the tapered male portion of the pivoting member.

5. The method of attaching the flanged shank of a tool to an externally, helically threaded hollow barrel of a pneumatic device capable of delivering a rapid succession of blows to said shank comprising rotationally threading on said barrel a spring element having a helical portion complementary to said helically threaded barrel and integral projections adjacent one end thereof and angularly spaced at less than 180°, a portion of one of said projections being spaced axially of the helical portion and including an open-sided arcuate bend substantially coaxial with the helical portion and with a radius substantially equal to the radius of the tool shank, the other of said projections having at least a portion thereof extending substantially tangential to said helical portion adjacent the closed side of said arcuate bend, compressing the spring element projections with a thumb and opposing fingers to move said arcuate bend to a position of substantial tangential alignment with said helical portion, inserting said flange tool shank coaxially into the barrel and spring element into a position such that the flange lies in the space between the helical portion and the arcuate bend of the spring portion, and releasing the compressive force on the projections to allow the arcuate bend to engage the tool shank and thereby hold the tool shank in coaxial position in the barrel.

6. A spring element for attaching the flanged shank of a tool to a pneumatic device comprising a helical portion having integral projections adjacent one end thereof angularly spaced at less than 180°, a portion of one of said projections being spaced axially of the helical portion and including an open-sided arcuate bend normally substantially coaxial with the helical portion and with a radius smaller than the radius of the helical portion, the other of said projections having at least a portion thereof extending substantially tangential to said helical portion adjacent to the closed side of said arcuate bend.

7. A tool for use with a pneumatic device for sequentially cutting and pushing bushing sleeves from holes, said tool comprising a flanged shank with an end portion thereof having a gently curved bevel extending from the lower end point on the shank periphery to a diametrically opposed upper point on the periphery axially spaced therefrom, the portion of said shank adjacent to said end portion being of a substantially uniform diameter with the unbeveled surface of said end portion being coextensive with said adjacent portion of said shank and including said lower end point being spaced from the longitudinal axis of said shank an amount equal to the corresponding point on the periphery of said adjacent portion of said shank, said bevel being of an extent in excess of the uniform shank diameter but less than three times said diameter, said bevel portion being symmetrically divided over a portion of its periphery adjacent the shank by a radially extending tapered thin portion having its maximum radial projection within the space axially aligned with the shank, said radial projection having a flat forwardmost surface defining a V-shaped channel with the undivided portion of the beveled surface positioned such that the angle portion of the channel is axially rearward of the legs.

8. A tool for use with a pneumatic device for installing cylindrical bushings of various sizes into holes, said tool comprising an elongated shank having integrally disposed on the forward end thereof a pilot cylinder portion and a driving cylinder portion, said driving cylinder portion having a diameter of at least twice the diameter of the pilot cylinder portion and being concentrically disposed axially rearward thereof, said driving cylinder having an end surface substantially perpendicular of said shank for delivering a succession of impacts against the bushings in a direction axial thereto from a plurality of non-coaxial circular areas on said end surface, said pilot cylinder having a diameter substantially less than the internal diameter of the smallest bushing with which said tool is adapted to be used, and a radially extending flange on said shank at the rearward end thereof, said flange being adapted to be received in the spring element of a pneumatic device whereby the pneumatic device may apply a succession of impacts against said rearward end of said tool in installing bushings in holes.

9. A tool for use with a pneumatic device for separating assembled parts, said tool comprising an elongated shank having at one end thereof an integral flared and bifurcated portion which is defined by wedge shaped internally smooth leg portions and an intermediate portion spacing said leg portions laterally of the axis of said shank by an equal amount, the juncture of said intermediate portion with said leg portions being formed on a relatively large interior radius, the opposing upper and lower surfaces of each of said leg portions and said intermediate portion defining continuous flat work-engaging surfaces over substantially the entire length thereof capable of exerting components of force perpendicular to the shank, the other end of said shank having a radially extending flange adapted to be received in a spring on a pneumatic device.

10. A method of replacing worn bushings in an automobile control arm and steering linkage assembly, said assembly including a bifurcated member with leg portions connected by an intermediate portion, said leg portions having coaxially aligned holes containing flanged hollow bushing members tightly fitted therein with said flanges disposed axially of said holes, said intermediate portion having a seat for an elongated pivoting joint member which includes an enlarged portion and an adjacent tapered male portion, said tapered male portion being seated in a complementary tapered female portion of a steering linkage element, said method including the steps of providing force applying means capable of delivering a rapid succession of blows to the shank of a tool, said tool being flared and bifurcated, and further having wedge-shaped internally smooth leg portions and an intermediate portion which spaces said leg portions a distance less than the overall width of the pivoting joint member enlarged portion and greater than the diameter of said tapered male portion, positioning the leg portions on the opposite sides of said pivoting joint member between said enlarged portion and tapered male portion with their opposing outer surfaces in wedging engagement with the steering linkage element, actuating said force applying means to deliver a succession of impacts to the shank of the tool which results in an axial component of force being directed outwardly against the steering linkage element thereby driving the tapered female portion from engagement with the tapered male portion of the pivoting joint member, providing a tapered tool having an arcuate work-engaging surface transverse to the shank of said tool and the surface thereon cooperating with said force applying means, positioning the arcuate surface against one bushing at an acute angle thereto between the bushing flange and its respective leg, actuating the force applying means to deliver a succession of impacts to the shank of the tool which results in an axial component of force being directed outwardly against the flange, thereby driving the bushing from said hole, repeating the positioning and actuating steps on the other bushing to remove said other bushing from its respective hole, inserting a tool having a pilot cylinder and driving cylinder concentrically and integrally disposed in coaxial relation with the shank at the end opposite the end cooperating with said force applying means, positioning a flanged hollow replacement bushing in coaxial alignment with the hole in one of the control arm legs with a pilot cylinder of the tool in the hollow of the bushing and the end of the driving cylinder of the tool abutting the flange, utilizing the force applying means to deliver a succession of impacts to the shank of the tool, which results in the axial force being directed against the bushing thereby driving the bushing into said hole, repeating the positioning and actuating steps on another replacement bushing to drive said other bushing into the hole of the other control arm leg and inserting the tapered male portion of the pivoting joint member into seated engagement with the complementary tapered female portion of the steering linkage element.

11. A method of replacing worn spindle tie rod ends in an automobile steering linkage assembly, said assembly including as an element thereof a rod end having a threaded stud member engaged by a complementary threaded, clamped split sleeve and a pivoting joint member having an enlarged portion and an adjacent tapered male portion, said tapered male portion being seated in a complementary tapered female portion of the spindle member, said method including the steps of providing a force applying means capable of delivering a rapid succession of blows to the flanged shank of a tool, said first tool having a generally cylindrical head which includes on its outer end a diametrically disposed channel having an arcuate cross section of such dimension as to receive the split sleeve readily therein, positioning the channel of the tool head against the split sleeve, actuating the force applying means to deliver a succession of impacts to the shank of the tool which results in vibration of the sleeve and clamps relative to each other and the threaded stud member of the rod end, providing a second tool means having a shank portion of a flared and bifurated tool having wedge-shaped internally smooth leg portions and an intermediate portion which spaces said leg portions a distance less than the overall width of said pivoting joint member enlarged portion and greater than the largest diameter of said tapered male portion, positioning the leg portions on opposite sides of the pivoting joint member between said enlarged portion and said tapered male portion with the opposing surfaces in wedging engagement with the spindle member, actuating the force applying means to deliver a succession of impacts to the shank of the tool, which results in an axial component of force being directed outwardly against the spindle member, thereby driving the tapered male portion from engagement with the tapered female portion to the spindle member, releasing the clamping force on the split sleeve and rotationally disassembling the rod end from threaded engagement with the sleeve, rotationally assembling a replacement rod end in threaded engagement with the sleeve, inserting the tapered male portion of the replacement rod end into seated engagement with the complementary tapered female portion of the spindle member, clamping the split sleeve firmly in engagement with the rod end to affix the steering linkage assembly elements rigidly in their proper relative positions.

12. A tool for use with a pneumatic device for sequentially cutting and pushing bushing sleeves from holes, said tool comprising, a flanged shank with an end portion thereof having a gently curved bevel extending from the lower end point on the shank periphery to a diametrically opposed upper point on the periphery axially spaced therefrom, the portion of said shank adjacent to said end portion being of a substantially uniform diameter with the unbeveled surface of said end portion being coextensive with said adjacent portion of said shank and including said lower end point being spaced from the longitudinal axis of said shank an amount equal to the corresponding point on the periphery of said adjacent portion of said shank, said bevel being of an extent in excess of the uniform shank diameter, said bevel portion being symmetrically divided over a portion of its periphery adjacent the shank by a radially extending tapered thin portion having its maximum radial projection within the space axially aligned with the shank, said radial projection having a flat forwardmost surface defining a generally V-shaped channel with the undivided portion of the beveled surface positioned such that the angle portion of the channel is axially rearward of the legs.

13. A method of replacing worn parts carried by an element of an automobile steering linkage assembly, said element including thereon at least one cylindrical hole within which a cylindrical hollow bushing member is tightly seated, said method including the steps of providing a pneumatic device capable of delivering a rapid succession of blows to the flanged shank of a tool attached thereto by means of a spring element secured thereon, securing a spring element to the pneumatic device, inserting in said spring element a cooperatively dimensioned flanged shank portion of a tool having a gently curved bevel extending from the end point on the shank periphery to a diametrically opposed point on the periphery axially spaced therefrom a distance in excess of the shank diameter, said bevel portion being symmetrically divided over a portion of its periphery adjacent the shank by a radially extending tapered thin portion having its maximum radial projection within the space axially aligned with the shank and having its forwardmost surface defining a V-shaped channel with the undivided portion of the beveled surface positioning the beveled surface leg of the channel between the element hole and the cylindrical bushing with the thin leg of the channel extending partially into the hollow of the bushing, actuating the pneumatic device to deliver a succession of impacts to the shank of the tool which results in an axial component of force being directed inwardly against the bushing from the angular portion of the V, thereby sequentially cutting a portion of the bushing and driving the bushing from said hole, removing the flanged shank of the beveled tool and inserting the similarly dimensioned flanged shank of a tool having a pilot cylinder and a driving cylinder of a diameter greater than the diameter of the pilot cylinder concentrically and integrally disposed in coaxial relation with said flanged shank at the end opposite the end inserted in said spring element, positioning a hollow replacement bushing in coaxial alignment with the element hole with the pilot cylinder of the tool in the hollow of the bushing in the end of the driving cylinder of the tool abutting the end surface thereof, actuating the pneumatic device to deliver a succession of impacts to the shank of the tool which results in an axial force being directed against the bushing, thereby driving the bushing into said hole.

14. A method of disassembling the ball joints connecting the control arm of an automobile to the spindle while the control arm is secured under the fender to the frame of the automobile, said ball joint having an elongated pivoting member which includes an enlarged portion and an adjacent tapered male portion carried by said control arm, said tapered male portion being seated in a complementary tapered female portion in the spindle, said method including the steps of providing force applying means capable of delivering a rapid succession of blows to the shank of a tool attached thereto by means of a spring element secured thereon, securing a spring element to the force applying means, inserting in said spring element a cooperatively dimensioned flanged shank portion of a flared and bifurcated tool having wedged shaped internally smooth leg portions and an intermediate portion which spaces said leg portions a distance less than the overall width of the pivoting member enlarged portion and greater than the largest diameter of said tapered male portion, positioning the leg portions on opposite sides of said pivoting member between said enlarged portion and tapered male portion with their opposing outer surfaces in wedging engagement with the member having the tapered female portion, actuating the force applying means to deliver a succession of impacts to the shank of the tool which results in driving said wedge shaped leg portions to a position straddling said pivoting member and the exertion of an axial component of force being directed outwardly against the enlarged portion of the pivoting member, thereby driving the tapered female portion from engagement with the tapered male portion of the pivoting member.

15. A method of replacing worn parts mounted on an element of an automobile assembly, said element including thereon at least one cylindrical hole within which a cylindrical hollow bushing member is tightly seated, said method including the steps of providing a pneumatic device capable of delivering a rapid succession of blows to the flanged shank of a tool attached thereto by means of a spring element secured thereon, securing a spring element to the pneumatic device, inserting in said spring element a cooperatively dimensioned flanged shank portion of a tool having a gently curved bevel extending from the end point on the shank periphery to a diametrically opposed point on the periphery axially spaced therefrom a distance in excess of the shank diameter, said bevel portion being symmetrically divided over a portion of its periphery adjacent the shank by a radially extending tapered thin portion having its maximum radial projection within the space axially aligned with the shank and having its forwardmost surface defining a generally V-shaped channel with the undivided portion of the beveled surface, positioning the beveled surface leg of the channel between the element hole and the cylindrical bushing with the thin leg of the channel extending partially into the hole of the bushing, actuating the pneumatic device to deliver a succession of impacts to the shank of the tool which results in an axial component of force being directed inwardly against the bushing from the angular portion of the V, thereby sequentially cutting a portion of the bushing and driving the bushing from said hole.

16. A tool adapted for use with a pneumatic air hammer for separating a joint having an enlarged pivoting member which includes an enlarged portion and an adjacent tapered male portion, with the tapered male portion being seated in a cooperatively tapered female portion of a second member; said tool comprising:
   an elongated central shank with at least one end thereof being of a substantially cylindrical configuration and adapted to be received in the pneumatic air hammer;
   a radially extending flange on said shank adjacent said one end thereof adapted to be engaged by a spring on the pneumatic air hammer;
   a substantially transverse flared shoulder integral with the other end of said shank and being symmetrically disposed on opposite sides of the longitudinal axis of said central shank;
   a pair of identical spaced apart legs projecting from opposite ends of said flared shoulder, with the longitudinal axis of each of said legs being substantially parallel to the longitudinal axis of said central shank;
   said legs being spaced apart a distance less than the overall width of the pivoting member enlarged portion and greater than the largest diameter of the tapered male portion whereby the tapered male portion may be received between the spaced apart legs;
   the opposed interior surfaces on said legs having a smooth internal configuration throughout the length thereof with the inner interior terminus of each of said legs being joined to said flared shoulder by a relatively large radius;
   at least one of the surfaces on each of said legs at right angles to said opposed surfaces having a longitudinally tapered configuration substantially throughout its entire length and including the adjacent portion of said shoulder, with the taper extending radially inwardly away from said central shank whereby placement of said tool with the tapered male portion between said legs engages said tapered surface with a portion of the pivoting member enlarged portion whereby impacts applied by said pneumatic air hammer to the cylindrical end of said central shank results in a component of force transverse to said central shank being directed against the pivoting member enlarged portion to withdraw the male portion from the female portion.

17. A method of replacing worn bushings in an automobile control arm assembly, which assembly includes a hole containing a radially flanged hollow bushing member tightly fitted therein, with said flange disposed against one surface of the assembly, said method including the steps of:
   providing a pneumatic device capable of delivering a rapid succession of blows to the flanged shank of a tool attached thereto by means of a spring element secured thereon;
   securing the spring element to the pneumatic device;
   inserting in said spring element a cooperatively dimensioned flanged shank portion of a flared and tapered tool having an arcuate work-engaging surface transverse to the shank of said tool;
   positioning the tool at an acute angle to the assembly with the arcuate surface between the bushing flange and the surface of the assembly;
   actuating the pneumatic device to deliver a succession of impacts to the shank of the tool which results in an axial component of force being directed outwardly against the flange thereby driving the bushing from the hole;
   removing the flanged shank of the flared and bifurcated tool from the spring element and inserting in the spring element a similarly dimensioned flanged shank of a tool having a pilot cylinder and driving cylinder concentrically and integrally disposed in coaxial relation with said flanged shank at the end opposite the end inserted in said spring element with the dimension of the pilot cylinder being substantially less than the inner diameter of the bushing;
   positioning a flanged hollow replacement bushing in coaxial alignment with the hole in the assembly with the pilot cylinder of the tool loosely received in the hollow of the bushing and the end of the driving cylinder of the tool abutting the flange; and
   actuating the pneumatic device to deliver a succession of impacts to the shank of the tool which results in an axial force being directed against the bushing thereby driving the bushing into the hole.

18. A method of replacing worn bushings in an automobile front end assembly which assembly includes at least one hole containing a hollow bushing member tightly fitted therein, said method including the steps of:
   removing the bushing from the hole;

providing a pneumatic device capable of delivering a rapid succession of blows to the flanged shank of a tool attached thereto by means of a spring element secured thereon;

securing the spring element to the pneumatic device;

inserting in said spring element a cooperatively dimensioned flanged shank of a tool having a pilot cylinder and driving cylinder concentrically and integrally disposed in coaxial relation with said flanged shank at the end opposite the end inserted in said spring element with the diameter of said pilot cylinder being less than the inner diameter of said hollow bushing;

positioning a hollow replacement bushing in coaxial alignment with the hole in the control arm assembly with the pilot cylinder of the tool loosely received in the hollow of the bushing and the end of the driving cylinder of the tool abutting the end of the bushing; and actuating the pneumatic device to deliver a succession of impacts to the shank of the tool which results in an axial force being directed against the bushing thereby driving the bushing into the hole.

19. A method of removing worn bushings in an automobile control arm assembly, which assembly includes a hole containing a radially flanged hollow bushing member tightly fitted therein, with said flange disposed against one surface of the assembly, said method including the steps of:

providing a pneumatic device capable of delivering a rapid succession of blows to the flanged shank of a tool attached thereto by means of a spring element secured thereon;

securing the spring element to the pneumatic device;

inserting in said spring element a cooperatively dimensioned flanged shank portion of a flared and tapered tool, said tool having a transversely extending flared portion symmetrically disposed on opposite sides of said shank, with said portion being tapered longitudinally inwardly away from said shank and terminating in an arcuate work-engaging surface transverse to the shank of said tool;

positioning the tool at an acute angle to the assembly, with the arcuate surface of said tool between the bushing flange and the surface of the assembly;

actuating the pneumatic device to deliver a succession of impacts to the shank of the tool while maintaining the acute angular disposition of the tool thereby causing an axial component of force to be directed outwardly against the flange and thereby driving the bushing from the hole.

20. A method of disassembly of a ball joint having an elongated pivoting member which includes an enlarged portion and an adjacent tapered male portion, said tapered male portion being seated in a complementary tapered female portion of a second member, said method including the steps of:

providing force applying means capable of being grasped in one hand and delivering a rapid succession of blows on the order of 3000 blows per minute to the shank of a tool attached thereto by means of a spring element secured thereon;

securing a spring element to the force applying means;

inserting in said spring element a cooperatively dimensioned flanged shank portion of a flared and bifurcated tool having identical wedged shaped internally smooth leg portions and an intermediate portion which spaces said leg portions a distance less than the overall width of the pivoting member enlarged portion and greater than the largest diameter of said tapered male portion;

positioning the leg portions on opposite sides of said pivoting member between said enlarged portion and tapered male portion with their opposing outer surfaces in wedging engagement with the member having the tapered female portion;

actuating the force applying means to deliver a succession of impacts on the order of 3000 blows per minute to the flanged end of the tool shank which results in driving said wedge shaped leg portions to a position straddling said pivoting member and the exertion of an axial component of force being directed outwardly against the enlarged portion of the pivoting member, thereby driving the tapered female portion from engagement with the tapered male portion of the pivoting member.

References Cited by the Examiner

UNITED STATES PATENTS

| | | | |
|---|---|---|---|
| 337,212 | 3/86 | Van Dusen | 1—418 |
| 1,009,875 | 11/11 | Whitelaw | 29—215 |
| 1,020,040 | 3/12 | Jenkins et al. | 30—168 |
| 1,105,590 | 7/14 | Abbott | 29—453 |
| 1,471,062 | 10/23 | Riblett | 30—168 |
| 1,598,458 | 8/26 | Sullivan | 30—168 X |
| 1,677,270 | 7/28 | Butler et al. | 279—19 |
| 1,719,311 | 7/29 | Sargent | 81—3 |
| 1,863,956 | 6/32 | Wilson | 29—275 |
| 1,984,960 | 12/34 | Beard | 254—104 |
| 2,176,626 | 10/39 | Gentry | 30—168 |
| 2,203,158 | 6/40 | Klein | 30—92.5 |
| 2,284,222 | 5/42 | Miller | 29—453 |
| 2,327,297 | 8/43 | Woodruff | 254—104 |
| 2,445,551 | 7/48 | Barry | 279—19.6 |
| 2,453,536 | 11/48 | Peck | 279—19 |
| 2,507,201 | 5/50 | Evans | 30—91 |
| 2,544,492 | 3/51 | Downing | 1—418 |
| 2,632,238 | 3/53 | Dyck | 29—215 |
| 2,664,620 | 1/54 | Beasley | 29—239 XR |
| 2,670,535 | 3/54 | Ogden | 30—91 |
| 2,682,103 | 6/54 | Hamilton | 29—275 |
| 2,730,176 | 1/56 | Herbold | 29—255 |
| 2,861,330 | 11/58 | Kratz | 29—275 |
| 2,960,767 | 11/60 | Vonhoff et al. | 30—168 X |
| 3,016,604 | 1/62 | Castelvecchi | 29—255 |

FOREIGN PATENTS

| | | |
|---|---|---|
| 789,457 | 1/58 | Great Britain. |
| 55,477 | 10/23 | Sweden. |

WHITMORE A. WILTZ, *Primary Examiner.*

NEDWIN BERGER, CHARLES T. MOON, *Examiners.*